Patented Feb. 3, 1931

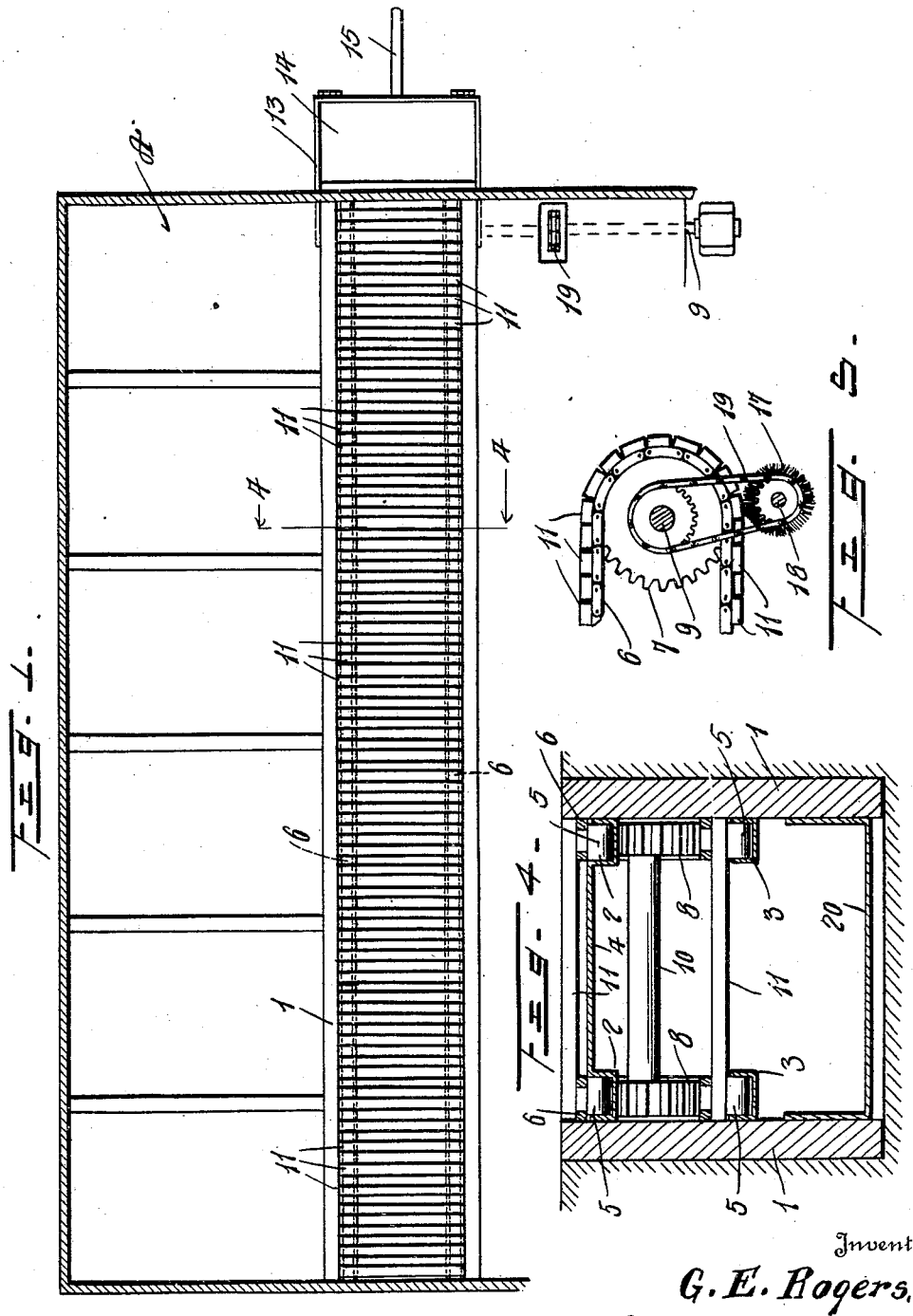

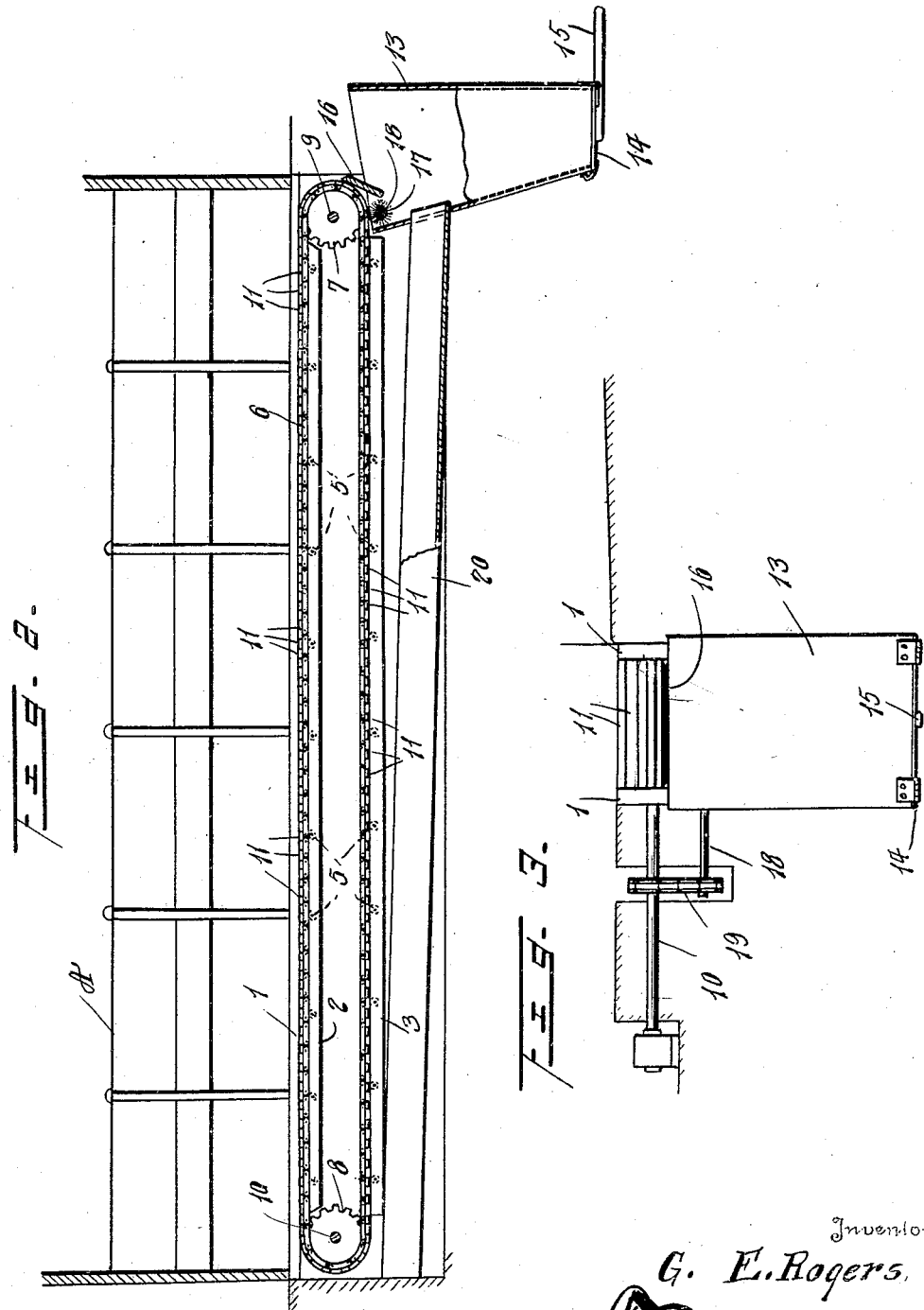

1,791,381

UNITED STATES PATENT OFFICE

GILBERT E. ROGERS, OF NORWICH, CONNECTICUT

MANURE HANDLER FOR STABLES

Application filed January 27, 1927. Serial No. 164,021.

The invention relates to means for removing manure from stables, and has for its principal object the provision of a device including an endless conveyor mounted to travel transversely of the stalls of the stable at the rear end of the stall to carry away and deposit in a suitable hopper container the solid portions of manure, and having arranged beneath the endless conveyor an inclined trough emptying into the hopper container for carrying away liquid manure, the hopper container being arranged with a lever operated door to permit removal of the contents into a wagon or truck for removal to a desired destination.

The invention will be described in detail hereinafter and will be found illustrated in the accompanying drawings in which Figure 1 is a plan view showing the manure handler in its relationship with the stalls of a stable, Figure 2, a side view partly broken away, Figure 3, an end view, Figure 4, a transverse sectional view on a plane indicated by the line 4—4 of Figure 1, and Figure 5, an enlarged detail of the actuating mechanism and the conveyor cleaners.

In the drawings similar reference characters will be used to designate corresponding parts throughout the several views.

The improved means for handling manure is shown installed in a stable, the stalls of the stable being designated A, and is designed to be erected in a trench arranged transversely of the stalls and at the rear thereof, the trench to be walled with concrete or any other suitable material, and constituting the support for the apparatus, the side walls of the trench being designated 1 and having secured thereto channel members 2 and 3 arranged at different elevations on the adjacent faces of the walls 1 and providing tracks for the endless conveyor to be hereinafter described. The channel members 2 are connected by a platform 4 to support the upper flight of the conveyor to be hereinafter described, and arranged at intervals in the channel members 2 and 3 are rollers 5 journaled in the upright sides of the channel members. The endless conveyor comprises endless chains 6 that are mounted on sprocket wheels 7 and 8 secured to shafts 9 and 10 respectively, journaled in the side walls 1, and chains 6 are connected by cross pieces 11 that rest on the platform 4 on the upper flight of the conveyor, the chains 6 being carried by the rollers 5 in the channel members 2 and 3. The conveyor is actuated by any suitable power means, an electric motor being indicated as connected directly to the shaft 9, but it is apparent that any other means for actuating the shaft may be substituted therefor, the electric motor being designated 12. The hopper container is arranged at the delivery end of the conveyor, designated 13, and may be provided with a hinged door 14 having an extended arm 15 that may be engaged to open the door to permit removal of the contained manure, it being apparent that the hopper may be so arranged that the manure will be deposited in a wagon or truck for removal to ground to be fertilized, or the manure may be deposited into a suitable pit by any suitable arrangement, this disposal of the manure not being a part of the invention.

A scraper 16 is arranged over the container 13 and engaging the conveyor to scrape any particles of manure that may be adhering thereto, and a rotary brush 17 is also provided and mounted on the shaft 18 actuated from the shaft 9 by chain and sprocket gearing 19 to thoroughly clean the conveyor and deposit the particles of manure separated therefrom into the container 13.

Located under the endless conveyor is an inclined trough 20 communicating with the container 13 that is adapted to catch and deposit into the container liquid manure.

The operation of the device will be apparent from the drawings and the above description, it being apparent that when the endless conveyor is actuated, the manure will be carried along the conveyor and deposited in the container 13 and at all times the liquid manure will be caught in the trough 20 and conveyed to the container 13 from whence the solid and liquid manure may be removed through the bottom of the container when the door 14 is opened.

What is claimed is:—

A handling mechanism of the class described comprising a conveyor, a receptacle for which one end of the conveyor is disposed so as to discharge into the same, a scraper adjacent the top of the receptacle coacting with the conveyor to remove material therefrom, the rear wall of the receptacle extending upwardly and rearwardly, and a chute for liquid matter disposed below the conveyor and communicating with the interior of the receptacle, the inclination of said rear wall serving to offset the discharge end of the trough rearwardly of said scraper so as to be out of the line of falling of scraped material.

In testimony whereof I affix my signature.

GILBERT E. ROGERS.